United States Patent [19]

Kwapong et al.

[11] Patent Number: 5,310,570
[45] Date of Patent: May 10, 1994

[54] HUNGER SUPPRESSING FOODSTUFF AND METHOD

[75] Inventors: Opokua Kwapong; Valerie Fedun-Jacklin, both of Valhalla, N.Y.

[73] Assignee: PepsiCo., Inc., Purchase, N.Y.

[21] Appl. No.: 821,633

[22] Filed: Jan. 16, 1992

[51] Int. Cl.[5] ............................................. A23L 2/00
[52] U.S. Cl. ................................. 426/590; 426/548; 426/2
[58] Field of Search ................................. 426/590, 548

[56] References Cited

U.S. PATENT DOCUMENTS

| | | | |
|---|---|---|---|
| 4,497,835 | 2/1985 | Winston | 426/590 |
| 4,554,167 | 11/1985 | Sorge | 426/590 |
| 4,619,833 | 10/1986 | Anderson | 426/590 |
| 4,830,870 | 5/1989 | Davis | 426/590 |
| 5,017,389 | 5/1991 | Green | 426/590 |
| 5,032,411 | 7/1991 | Stray-Gunderson | 426/590 |
| 5,114,723 | 5/1992 | Stray-Gunderson | 426/590 |

*Primary Examiner*—Carolyn Paden
*Attorney, Agent, or Firm*—Scully, Scott, Murphy & Presser

[57] ABSTRACT

A food product with high titratable acidity which is effective to suppress hunger is disclosed. The product is buffered to maintain the product at a pH of 2.5–6.0.

10 Claims, No Drawings

HUNGER SUPPRESSING FOODSTUFF AND METHOD

This invention relates to foodstuffs for suppressing hunger and particularly soft drinks formulated to high total titratable acidity effective to suppress hunger when ingested prior to a meal.

BRIEF DESCRIPTION OF THE PRIOR ART

Soft drinks of all varieties are well known. They are prepared from still or carbonated water either at home or bottled for sale in the retail trade. The beverages are composed of water, sweetening agents, acid flavor, color and optionally buffering agents and preservatives. Many contain clouding systems designed to replicate natural beverages particularly fruit beverages.

The sweetener, acid and carbon dioxide ratios vary with the type of beverage flavor. FDA approved food colors are often used. Flavors are available from suppliers and can be alcohol extracts of ginger, grape and certain lemon-lime flavors. Emulsion of essential oils are available for citrus flavors, as well as root beer and cola. Caffeine is often added for bitterness. Fruit juice is widely used to manufacture orange, grapefruit, lemon, grape and lime beverages. Sodium citrate is sometimes employed as a buffering agent.

Acidulents are widely used with citric acid, phosphoric acid, malic acid and tartaric acid most commonly used in carbonated beverages. These acids are usually employed at up to 0.12% by weight in ginger ale and lemon-lime and orange beverages and lower amounts in root beer and cola. Higher amounts are used in lemonade and grapefruit. See Kirk-Othmer, Encyclopedia of Chemical Technology, Vol. 4, pp 710–725 by John Wiley & Sons, New York, N.Y. (1978).

Numerous patents have disclosed sweetening compositions for beverages and beverages of reduced calories or of improved nutritional value. U.S. Pat. No. 3,647,483, to Eisenstadt, teaches a saccharine sweetening composition comprising saccharine, with glucono-delta-lactone, sodium and/or potassium gluconate and cream of tartar used to avoid the bitter aftertaste of saccharine. The composition is not an acidic beverage and if employed in a beverage would not give the acid content required by the present invention.

U.S. Pat. No. 3,946,121, to Eisenstadt, discloses a sweetener consisting of saccharin, glucono-delta-lactone and an edible bicarbonate. Both Eisenstadt sweetener compositions are intended to sweeten coffee, tea and conventional beverages. U.S. Pat. No. 3,619,205, to Le Van, et al., discloses a slush iced beverage of still or carbonated water. Equal portions of the spoonable slush are mixed with water to form the beverage.

Hawley, *The Condensed Chemical Dictionary*, 10th edition, pp. 500, 501, teach glucono-delta-lactone and gluconic acid. Winter, *A Consumer's Dictionary of Food Additives*, p. 115, Crown Publishers, Inc., New York, NY, teach glucono-delta-lactone is an acid used as a leavening agent, and in jelly and soft drinks where a dry food acid is desired.

Tsai, et al., U.S. Pat. No. 4,946,701, teaches fruit juice, tea and coffee beverages.

U.S. Pat. No. 3,846,560, to Hempenius, et al., relates to a process for the preparation of an acidified beverage rich in solubilized polypeptide.

U.S. Pat. No. 4,010,285, to Van Doren Jr., discloses an improved aqueous base soft drink concentrate formulation, and more particularly to a formulation which is particularly adapted for retention of carbon dioxide. The flavor concentrate can include sodium citrate, sodium gluconate and glucono-delta-lactone.

U.S. Pat. No. 4,015,023 to Lamberti, et al., relates to the use of certain substituted succinic acid compounds as food additives.

U.S. Pat. No. 4,042,684, to Kahm, relates to a dietetic beverage for supplementing the requirements of sugar and essential salts in a mammalian body and, more especially, to those requirements in a human body where such components have been depleted through vigorous physical activity. The dietetic composition comprises:

| Fructose | 0.4–0.7% |
| --- | --- |
| Glucose | 1.6–2.8% |
| Sodium Chloride | 0.16–0.33% |
| Potassium Chloride | 0.03–0.13% |
| Free Citric Acid | 0.026–0.26% |
| | balance |

U.S. Pat. No. 4,200,662, to Scibelli, relates to turbid protein fortified acidic soft drinks which have a stable suspension of particles therein.

U.S. Pat. No. 4,478,855, to Dahlen, et. al., relates to a fruit juice drink.

U.S. Pat. No. 4,497,800, to Larson, et al., discloses a nutritionally complete liquid diet composition formulated to give a stabilized ready-to-use liquid product useful in providing for patients with compromised digestive function.

U.S. Pat. No. 4,690,827, to Kupper, et al., relates to a beverage which comprises fruit juice, water and a non-nutritive sweetener, characterized in that it has a background pulp level which is at least 20%, preferably at least 70%, greater than the background pulp level that would be obtained by low shear mixing of the ingredients.

U.S. Pat. No. 4,834,990, to Amer, relates to improved non-dairy liquid food products such as fruit juices or drinks or other non-dairy liquids containing significant amounts of dietary fiber and desirable calcium.

U.S. Pat. No. 4,871,571, to Jensen, et al., relates to a low calorie bulking agent and to the employment of a beta glucan hydrolysate as a substitute for sucrose, glucose and the like in a dietetic beverage.

None of the prior art references suggest that human satiety could be achieved by upward adjustments of the acid content of a beverage.

SUMMARY OF THE INVENTION

We have discovered a unique method of producing satiety by increasing the titratable acidity of a foodstuff particularly beverages. The beverage is prepared using a unique combination of common food ingredients, is palatable, satiating, and low calorie. When consumed before meals the beverage has been shown to decrease subsequent meal intake.

The beverage is prepared using a high concentration of edible acid of up to 5 to 20 times greater than normally employed in beverages and at least fifty percent greater than the titratable acidity of still lemonade or carbonated lemonade. The high acid content lowering effect on pH is buffered using high levels of metal salts of the same acids to maintain a pH of 2.5–4.0.

An intensive sweetener is used to further reduce calorie content.

We have found at least a 10% reduction in food intake resulting from ingesting the foodstuff shortly before a meal.

DETAILED DESCRIPTION OF THE INVENTION

We have developed good tasting foodstuffs particularly diet soft drinks which do not rely on drugs to result in decreased food consumption and do not replace calories with inert materials. We have surprisingly found that a conventionally tasting soft drink can be made by increasing the acid content of a beverage to raise the total titratable acidity (TA) of the beverage to at least about 125 TA and preferably about 150 TA. This is accomplished by a blend of common acids and preferably with the use of glucono-delta-lactone.

$$\text{Titratable acidity as used herein is} = \frac{\text{lbs of acid}}{\text{gallons of beverage}} \times \frac{11.9826}{TA \text{ milliequivalents}}$$

Where 11.9826 is the conversion factor from lbs/gallon to gram/ml.

$$TA \text{ milliequivalents} = \frac{\text{molecular wt of the acid}}{\text{number of electrons}} \div 1000 \times 0.1$$

TA milliequivalents for glucono-delta-lactone = 0.0178141 citric acid = 0.006404 anhydrous phosphoric acid = 0.0049 100% acid

Other components such as carbonation, sweetener, caramel, color and flavor may contribute to the total acidity in a minimal way.

We have found that the use of glucono-delta-lactone helps us balance flavor and produces a better tasting beverage. We particularly prefer to employ the glucono-delta-lactone with an organic acid and phosphoric acid and often in roughly equal TA portions of one to two parts of each of organic and phosphoric acid TA contribution to each one part glucono-delta-lactone TA contribution.

The glucono-delta-lactone has a low sourness and produces a beverage less tart and sour at low pH than a beverage using other inorganic acidulents.

We have also found it necessary to buffer our very acid food stuff with metal salts of the same acids employed for acidulation. We have found common citrates and phosphates to be highly effective in maintaining the beverage pH above 2.5, preferably 2.5–4.0 and most preferably pH 2.5–3.5.

We employ organic and inorganic acids such as citric, phosphoric, glucono-delta-lactone, gluconic, malic, tartaric, fumaric, adipic and mixtures thereof. We prefer to employ a major amount of citric, phosphoric and the glucono-delta-lactone usually 60%, preferably 75% or more of the acid content of the food stuff. Our food stuff usually contains on a dry weight basis from 5–40% citric acid, preferably 10–25% and from 20–60% glucono-delta-lactone, preferably at least 30% and more preferably 35–55% of the foodstuff. The total acidic materials are employed at about 50–90%, preferably 60–80% and most preferably 65–80% of the foodstuff.

We employ buffers to maintain a pH of 2.5–6.0, preferably pH 2.5–4.0 and most preferably pH 2.5–3.5. We have found that the metal salts of the common acids such as sodium or potassium citrate, disodium or dipotassium phosphate and the like work very well to elevate the low pH caused by the high titratable acidity. We employ buffers from 10–40%, more preferably in excess of 15% and most preferably from 15–35% of the food stuff.

An intensive sweetener which is food approved is employed such as one selected from the group of "aspartame", "sucralose", "acetosulfam", "saccharine", "cyclamate" or others of equivalent sweetness and mixtures thereof.

The type of sweetener is not critical to our invention so long as it is stable in the food for the period of its use. However, we prefer to prepare reduced calorie foods and to use an intensive sweetener exclusively. The intensive sweetener is normally used up to 5%, preferably 0.1–4% of the food stuff depending upon its intensity.

In preparing syrups for beverages, we employ from 1–3% citric acid or combinations of organic acids, 1.5–2.5% phosphoric acid, 2.0–10% glucono-delta-lactone, from 1.0–4.5% acid buffering salts such as alkali metal citrates, mono and di alkali metal phosphates and sweeteners such as aspartame to taste.

The good tasting, satiety producing beverage of this invention can be prepared from still water but is preferably carbonated. The beverage contains at least 0.15% and preferably 0.2% organic acid, preferably citric acid, at least 0.15% and preferably 0.7–1.5% and most preferably 0.85–1.25% glucono-delta-lactone, at least 0.25% acid buffering salt, preferably an alkali metal salt of the acids employed in this invention and most preferably at least 0.4% buffering salt.

The beverage is usually prepared by dissolving the ingredients in water to form a syrup which is blended volumes of carbon dioxide in the final beverage. If desired, however, dry mixes can be prepared for dissolution in water by the consumer or in preparing bottled still beverages.

Flavors, fruit juice, caffeine and other conventional ingredients may be used to formulate the final beverage.

In preparing our beverage the total acid content of the beverage should be 0.7% or greater, preferably 0.75% to 1.5% of the beverage which is five to twenty times greater than in the equivalent non-satiety beverage. The buffer concentration is also high exceeding 0.4%, preferably 0.45% of the beverage to elevate and maintain the pH at 2.5 to 3.5.

The invention is further exemplified by the following example:

| Example Pink Grapefruit Juice | | |
|---|---|---|
| Syrup Formula | lbs | T.A. |
| Citric Acid | 24.0 | 49.9 |
| Phosphoric Acid (80) | 22.5 | 49.9 |
| Glucono-delta-lactone | 66.9 | 50.0 |
| Potassium Citrate | 26.0 | — |
| Dipotassium Phosphate | 15.5 | — |
| Aspartame | 3.75 | trace |
| Total | 158.65* | 150.0 |
| Water to | 150.00 gal | |

*Throw = 1 part syrup plus 5 parts water
150 gal = 900 gallons of finished beverage Dissolve the previous listed ingredients in water sufficient to prepare 150 gallons of syrup. Dilute the syrup 5 to 1 with carbonated water and bottle to prepare 900 gallons of a final carbonated drink having the following characteristics:

| Characteristic | greater than | preferably at least | most preferably about |
|---|---|---|---|
| TA | 110 | 125 | 150 |
| pH | 2.0–6.0 | 2.5–4.0 | 2.5–3.5 |
| Sweetener | to taste | | 457–525 ppm |
| $CO_2$ | 0–6.0 vol | 1.0–5.0 vol. | 2.5–3.5 vol |

When 16 oz of the above prepared beverage iS ingested by a small test panel of humans 20 minutes prior to a macaroni and beef meal, the amount of food eaten is reduced by 10–30% and yet the beverage tastes like a conventional diet soft drink. The 10–30% reduction in food intake has been replicated three times, two of which were statistically significant.

While this invention is applicable to mono and disaccharide sweetened beverages including coffee and tea, it is most applicable to diet beverages sweetened with intensive sweeteners especially citrus flavored beverages. The invention is most applicable to normally high acid citrus beverages such as grapefruit drinks and lemonade.

Unless otherwise indicated, all percentages are by weight.

What is claimed is:

1. A method of supressing hunger in a subject in need thereof which comprises administering orally to said subject a foodstuff, said foodstuff comprising: (i) an intensive sweetener, (ii) an amount of acid sufficient to maintain a total titratable acidity in excess of 100, and (iii) a buffer to maintain the pH of a solution of said foodstuff above 2.5; said amount of acid effective to suppress hunger on later ingestion of food; wherein the titratable acidity of said foodstuff which is attributable to a given acid present therein is related to the amount of said acid in pounds present therein by the equation;

$$\text{titratable acidity} = \frac{\text{pounds of acid}}{\text{gal. of foodstuff}} \times \frac{11.9826}{(\text{mol. wt. of acid/no. of electrons}) \div 1000 \times 0.1}$$

2. The method of claim 1 wherein the foodstuff is a still or carbonated beverage having a pH from 2.5–6.0, and wherein the acid is selected from the group consisting of citric acid, glucono-delta-lactone, gluconic acid, malic acid, tartaric acid, fumaric acid, adipic acid and mixtures thereof and the buffer is a salt of one or more of said acids.

3. The method of claim 2 wherein the acid comprises citric acid, phosphoric acid and glucono-delta-lactone.

4. The method of claim 3 in which each of the phosphoric and citric acids is present in at least 0.15% and the glucono-delta-lactone is present in at least 0.7% of the beverage.

5. The method of claim 3 in which the buffer is present above about 0.25% of the beverage.

6. The method of claim 5 in which the mixture of acids is present in from at least 0.7% of the beverage.

7. The method of claim 6 which contains at least 0.2% citric acid, at least 0.2% phosphoric acid, at least 0.7% glucono-delta-lactone, at least 0.4% buffering material comprising salts of acids effective to maintain the pH from 2.5 to 3.5 and an intensive sweetener.

8. A palatable, low calorie foodstuff comprising; an acid selected from the group consisting essentially of citric acid, phosphoric acid, glucono-delta-lactone, gluconic acid, malic acid, tartaric acid, fumaric acid, adipic acid and mixtures thereof in an amount effective to provide a total titratable acidity of at least 100; salts of said acids effective to buffer a solution of the foodstuff to pH 2.5–6.0; sweetener; and flavoring; wherein the titratable acidity of said foodstuff which is attributable to a given acid present therein is related to the amount of said acid in pounds present therein by the equation;

$$\text{titratable acidity} = \frac{\text{pounds of acid}}{\text{gal. of foodstuff}} \times \frac{11.9826}{(\text{mol. wt. of acid/no. of electrons}) \div 1000 \times 0.1}$$

9. The foodstuff of claim 8 wherein the acid titratable acidity is at least 125 and the foodstuff includes 5–40% citric acid, 5–30% phosphoric acid, 20–60% glucono-delta-lactone, and 10–40% buffer.

10. The foodstuff of claim 9 comprising 10–35% citric acid, 10–25% phosphoric acid, 35–55% glucono-delta-lactone, from 10–40% acid buffers, and up to 5% intensive sweetener.

* * * * *

UNITED STATES PATENT AND TRADEMARK OFFICE
CERTIFICATE OF CORRECTION

PATENT NO. : 5,310,570                    Page 1 of 3
DATED     : May 10, 1994
INVENTOR(S) : Opokua Kwapong, et al.

It is certified that error appears in the above-indentified patent and that said Letters Patent is hereby corrected as shown below:

On the Title Page, Section [56], before "4,497,835..." insert the following:

| | | |
|---|---|---|
| --3,619,205 | 11/1971 | Le Van et al. |
| 3,647,483 | 3/1972 | Eisenstadt |
| 3,846,560 | 11/1974 | Hempenius et al. |
| 3,946,121 | 3/1976 | Eisenstadt |
| 4,010,285 | 3/1977 | Van Doren Jr. |
| 5,015,023 | 3/1977 | Lamberti et al. |
| 4,042,684 | 8/1977 | Kahm |
| 4,200,662 | 4/1980 | Scibelli |
| 4,478,855 | 10/1984 | Dahlen et al. |
| 4,497,800 | 2/1985 | Larson et al.-- and after |

"4,619,833..." insert the following:

--4,690,827    9/1987    Kupper et al.-- and after "4,830,870..." insert the following:

| | | |
|---|---|---|
| --4,834,990 | 5/1989 | Amer |
| 4,871,571 | 10/1989 | Jensen et al. |
| 4,946,701 | 8/1990 | Tsai et al. -- |

UNITED STATES PATENT AND TRADEMARK OFFICE
CERTIFICATE OF CORRECTION

PATENT NO.   : 5,310,570
DATED        : May 10, 1994
INVENTOR(S)  : Opokua Kwapong, et al.

It is certified that error appears in the above-indentified patent and that said Letters Patent is hereby corrected as shown below:

On the Title Page, Section [56], after "5,114,723..." insert the following:
--OTHER PUBLICATIONS
Kirk-Othmer, Encyclopedia of Chemical Technology, Volumn 4, pages 710-725, John Wiley & Sons, New York, NY (1978).
Hawley, The Condensed Chemical Dictionary, 10th edition, pages 500, 501.
Winter, A Consumer's Dictionary of Food Additives, page 115, Crown Publishers, Inc., New York, NY (1972).

Column 2, line 1: delete "to"
Column 5, line 8: "457" should read --475--
Column 5, line 10: "iS" should read --is--
Column 6, line 21, Claim 8: "comprising;" should read --comprising:--

UNITED STATES PATENT AND TRADEMARK OFFICE
CERTIFICATE OF CORRECTION

PATENT NO. : 5,310,570

DATED : May 10, 1994

INVENTOR(S) : Opokua Kwapong, et al.

It is certified that error appears in the above-indentified patent and that said Letters Patent is hereby corrected as shown below:

Column 6, line 31, calim 8: "equation;" should read --equation:--

Signed and Sealed this

Sixteenth Day of May, 1995

Attest:

BRUCE LEHMAN

Attesting Officer *Commissioner of Patents and Trademarks*